(12) United States Patent
Feng et al.

(10) Patent No.: US 10,218,140 B2
(45) Date of Patent: Feb. 26, 2019

(54) LASER SECURITY INTERLOCKING DEVICE AND CORRESPONDING METHOD

(71) Applicant: Nuctech Company Limited, Beijing (CN)

(72) Inventors: Huacheng Feng, Beijing (CN); Yumin Yi, Beijing (CN); Hongqiu Wang, Beijing (CN); Rui Fan, Beijing (CN); Shixin Zhang, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 15/835,308

(22) Filed: Dec. 7, 2017

(65) Prior Publication Data

US 2018/0183201 A1 Jun. 28, 2018

(30) Foreign Application Priority Data

Dec. 26, 2016 (CN) .......................... 2016 1 1222586

(51) Int. Cl.
*F16P 3/08* (2006.01)
*H01S 3/00* (2006.01)
*H01S 3/10* (2006.01)
*G05B 19/05* (2006.01)
*G08B 13/183* (2006.01)

(52) U.S. Cl.
CPC .......... *H01S 3/0014* (2013.01); *G05B 19/058* (2013.01); *G08B 13/183* (2013.01); *H01S 3/0007* (2013.01); *H01S 3/10038* (2013.01); *F16P 3/08* (2013.01)

(58) Field of Classification Search
CPC .... G05B 19/058; G08B 13/183; H01S 3/0014
See application file for complete search history.

(56) References Cited

U.S. PATENT DOCUMENTS

| 4,070,681 A | * | 1/1978 | Ichikawa | ................. B41J 2/471 |
| | | | | 347/136 |
| 2005/0130453 A1 | * | 6/2005 | Inada | ................ H01L 21/67276 |
| | | | | 438/800 |

* cited by examiner

*Primary Examiner* — Omeed Alizada
(74) *Attorney, Agent, or Firm* — Knobbe Martens Olson & Bear LLP

(57) ABSTRACT

The disclosed technology provides a laser security interlocking device and a corresponding method. In one aspect, an example laser security interlocking device includes a housing, a laser capable of emitting laser light in the housing and a laser light-emitting interlocking circuit, with the housing including a door capable of being opened or closed. When the door is closed, the housing can define an enclosed space within which the laser is positioned. The laser light-emitting interlocking circuit is configured to control the laser security interlocking device to automatically stop the laser emitting laser light before or while the door is opened.

8 Claims, 2 Drawing Sheets

LASER SECURITY INTERLOCKING DEVICE AND CORRESPONDING METHOD

CROSS-REFERENCE TO RELATED APPLICATIONS

The present application claims priority to Chinese Patent Application No. 201611222586.1, filed on Dec. 26, 2016, entitled "LASER SECURITY INTERLOCKING DEVICE AND CORRESPONDING METHOD", which is incorporated herein by reference in its entirety.

BACKGROUND OF THE DISCLOSED TECHNOLOGY

Field of the Technology

The disclosed technology relates to a field of radiation detection, and especially to a laser security interlocking device and a corresponding method.

Description of the Related Technology

In devices utilizing lasers, it is desired to prevent the laser from emitting on a human body to avoid bodily injury.

Some of the existing laser devices use a laser lock utilizing plug-in or plug out or a mechanism similar to an emergency stop button to turn on or off the laser light. However, the time for stopping emitting light of such a type of devices is completely dependent on an operator's action time. Such a scheme cannot immediately and automatically cut off the laser light source in the event of laser irradiation on the human body.

Some of the laser devices uses a laser baffles to avoid laser directly irradiating human tissue, in order to a purpose of laser security protection. However, such a type of device does not completely eliminate the possibility of the laser being irradiated to the human body. For example, if the laser light encounters a specular reflection device, it may be reflected onto human tissues, which may lead to bodily damage.

It is desired to provide a device that may completely eliminate the possibility of laser irradiation to the human body.

SUMMARY OF CERTAIN INVENTIVE ASPECTS

Embodiments of the disclosed technology provide a laser security interlocking device and a corresponding method to completely avoid possibility of laser irradiation to the human body.

According to one aspect of the disclosed technology, there is provided a laser security interlocking device including a housing, a laser capable of emitting laser light in the housing and a laser light-emitting interlocking circuit, wherein the housing includes a door capable of being opened or closed, and when the door is closed the housing defines an enclosed space within which the laser is positioned; and wherein the laser light-emitting interlocking circuit is configured to control the laser security interlocking device to automatically stop the laser emitting laser light before or while the door is opened.

In one embodiment, the laser light-emitting interlocking circuit includes a central control unit for associating an operation of the door with that of the laser so as to control operations of the door and the laser so that the laser is enabled only when the door is closed or the laser is disabled before or while the door is opened.

In one embodiment, the laser light-emitting interlocking circuit further includes a door state detecting device configured to detect whether the door is in an opened state or a closed state, and a signal indicating the detected opened state or the closed state of the door is transmitted to the central control unit.

In one embodiment, the laser light-emitting interlocking circuit further includes an "AND" logic control unit configured to receive a signal from the central control unit for controlling the laser and the signal indicating the state of the door detected by the door state detecting device, and outputting a laser enable signal by means of hardware circuit based on the signal from the central control unit for controlling the laser to emit laser light and the signal indicating the closed state of the door detected by the door state detecting device, so that the laser emits laser light.

In one embodiment, the "AND" logic control unit is configured not to output the laser enable signal so that the laser is disabled to emit laser light when the door is opened.

In one embodiment, the "AND" logic control unit is configured to switch off a power of the laser when the door is opened.

In one embodiment, the central control unit is configured to control the laser not to emit laser light when the door is opened.

The laser security interlocking device may block the laser within an enclosed space. Once the door is opened, the laser stops emitting light immediately under cooperation of hardware and software, which completely eliminates the possibility of laser irradiation to the human body.

According to another aspect of the disclosed technology, there is provided a laser security interlocking method for a laser security interlocking device, the laser security interlocking device including a housing, a laser capable of emitting laser light in the housing and a laser light-emitting interlocking circuit, wherein the housing includes a door capable of being opened or closed, and when the door is closed the housing defines an enclosed space within which the laser is positioned; and the laser security interlocking method includes utilizing the laser light-emitting interlocking circuit to control the laser security interlocking device to automatically stop the laser emitting laser light before or while the door is opened.

In one embodiment, the laser security interlocking method further includes associating an operation of the door with that of the laser so as to control operations of the door and the laser so that the laser is enabled only when the door is closed or the laser is disabled before or while the door is opened.

In one embodiment, the laser security interlocking method further includes utilizing a door state detecting device of the laser light-emitting interlocking device to detect whether the door is in an opened state or a closed state, and to control the laser according to the detected opened state or closed state of the door.

In one embodiment, the laser security interlocking method further includes utilizing an "AND" logic control unit of the laser light-emitting interlocking circuit to receive a signal from the central control unit for controlling the laser and the signal indicating the state of the door and detected by the door state detecting device, and to output a laser enable signal by means of hardware circuit based on the signal from the central control unit for controlling the laser to emit laser light and the signal indicating the closed state of the door detected by the door state detecting device, so that the laser emits laser light.

In one embodiment, the laser security interlocking method further includes utilizing the "AND" logic control unit to switch off the laser enable signal by means of hardware circuit so that the laser is disabled to emit laser light when the door is opened.

In one embodiment, the laser security interlocking method further includes utilizing the "AND" logic control unit to switch off a power of the laser when the door is opened.

In one embodiment, the laser security interlocking method further includes controlling the laser not to emit laser light by means of software when the door is opened.

DETAILED DESCRIPTION OF CERTAIN ILLUSTRATIVE EMBODIMENTS

Figure 1:
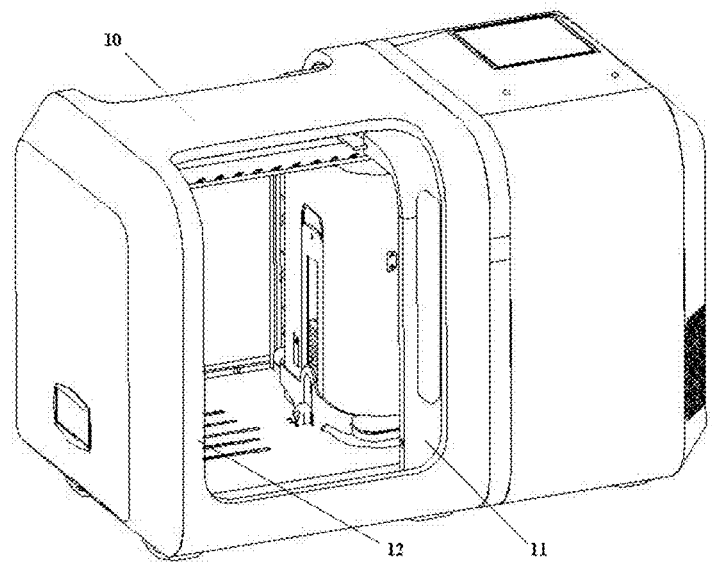
FIG. 1 is a schematic view of a laser security interlock device according to one embodiment of the disclosed technology in which the door is in an opened state.
Figure 2:
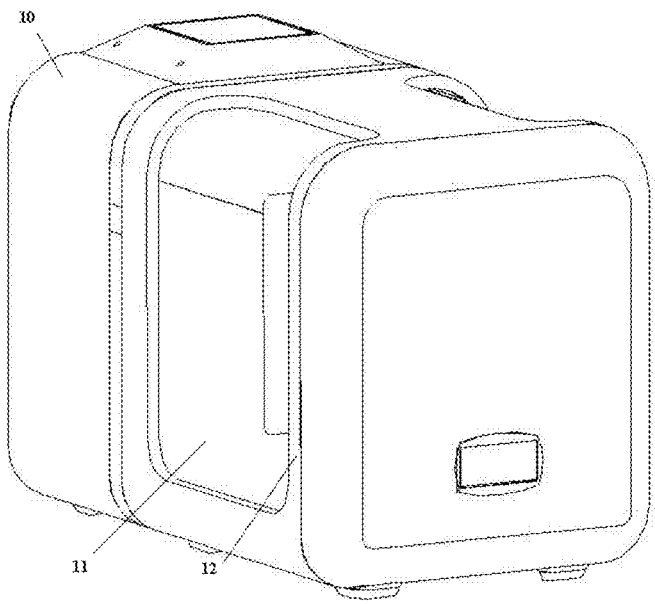
FIG. 2 is a schematic view of a laser security interlock device according to one embodiment of the disclosed technology in which the door is in a closed state.

While there are various modifications and alternative forms for the present invention, specific embodiments thereof are shown by way of example in the drawings and will be described in detail herein. However, it should be understood that the drawings and detailed description are not intended to limit the invention in the particular forms, but on the contrary, they cover all of the modifications, equivalents and substitutions falling within spirit and scope of the invention as defined by the appended claims. The drawings are for the purpose of illustration and are not drawn to scale.

A plurality of embodiments according to the present invention will be described below with reference to the drawings.

One embodiment of the present invention provides a laser security interlocking device including a housing 10, a laser capable of emitting laser light in the housing 10 and a laser light-emitting interlocking circuit, wherein the housing 10 includes a door 11 capable of being opened and closed, and when the door 11 is closed the housing 10 defines an enclosed space within which the laser is positioned. The laser light-emitting interlocking circuit is configured to control the laser security interlocking device to automatically stop the laser emitting laser light before or while the door 11 is being opened or is opened.

In one embodiment, the laser light-emitting interlocking circuit of the laser security interlocking device may include a central control unit configured to associate an operation of the door 11 with that of the laser so as to control the door 11 and the laser such that the laser is enabled to be activated only when the door 11 is closed and the laser is disabled before or while the door 11 is opened. The central control unit is further configured to control the laser not to emit laser light by means of software when the door 11 is opened. For example, the central control unit utilizes software to stop the laser emitting light.

In one embodiment, the laser light-emitting interlocking circuit of the laser security interlocking device may further include a door state detecting device configured to detect whether the door 11 is in an opened state or a closed state, and transmit a signal indicating the detected opened state or the closed state of the door 11 to the central control unit. For example, a laser probe may be provided in the housing 10, and the laser probe may determine whether the door 11 is in the closed state or the opened state, for example, by detecting whether the door 11 is in the closed position. The laser probe may also determine whether the door 11 is closed or opened by detecting whether an edge of the door 11 contacts a doorframe 12 of the housing 10. For example, when the edge of the door 11 contacts the doorframe 12, it is determined that the door 11 is in the closed state. When it is detected that the edge of the door 11 does not contact the doorframe 12, it is determined that the door 11 is in an opened state. The laser probe may be implemented in many forms and herein is omitted its detail description for brevity.

In one embodiment, the laser light-emitting interlocking circuit of the laser security interlocking device may further include an "AND" logic control unit configured to receive a signal for the central control unit for controlling the laser and the signal indicating the state of the door 11 detected by the door state detecting device, and outputting a laser enable signal by means of hardware circuit based on the signal from the central control unit for controlling the laser to emit laser light and the signal indicating the closed state of the door 11 detected by the door state detecting device, so that the laser emits laser light. In other words, only when the central control unit controls the laser to emit laser light and the door state detecting device detects that the door 11 is in the closed state, the "AND" logic control unit outputs an enable signal so that the laser emits light. Furthermore, in one embodiment, the "AND" logic control unit is configured not to output the laser enable signal so that the laser is disabled to emit laser light when the door 11 is opened. In one embodiment, the "AND" logic control unit is configured to switch off power of the laser when the door 11 is opened. In other words, in both situations when the door 11 is opened and when the door 11 is in the opened state, the "AND" logic control unit is configured not to output the laser enable signal and the laser cannot emit laser light.

Figure 3:
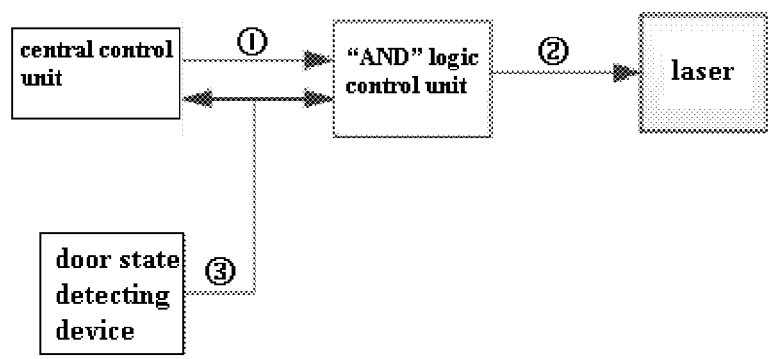
FIG. 3 is a principal block diagram of a laser light-emitting interlocking circuit according to an embodiment of the disclosed technology.

FIG. 3 shows a principal block diagram of a laser light-emitting interlocking circuit according to an embodiment of the disclosed technology. In the laser light-emitting interlocking circuit, the central control unit may generate a laser enable signal ② for controlling turning-on or turning off the laser by applying a logical "AND" operation to a laser control signal ① and the detected state signal of the door 11 ③ by the "AND" logic control unit. Only when the central control unit sends an instruction to the laser for emitting light and the door 11 is in the closed state, the "AND" logic control unit will output a valid laser enable signal to the laser for emitting light. When the door 11 is opened or the door 11 is in an opened state, one of the input conditions of the "AND" logic control unit cannot be satisfied, so the laser enable signal cannot be outputted and the laser cannot emit light, which is a hardware-based laser interlocking.

Meanwhile, the state signal ③ of the door from the door state detecting device is transmitted to the central control unit which, under the intervention of the software, stops the laser control signal ① so that the two input conditions of the "AND" logic control signal cannot be simultaneously satisfied and the laser enable signal ② is further disabled, which is a software-based laser interlocking or to implement interlocking by means of software.

In the control logic circuit as mentioned above, as long as the door 11 is opened, regardless of whether the laser is emitting light at this moment, the laser light-emitting enable signal is immediately disabled by the circuit hardware or by means of hardware so that the laser immediately stops emitting light. Therefore, one of the preconditions for the laser to emit light is that the door 11 must be closed. This completely guarantees that the laser may only operate in a closed space so as to ensure the security of the operator and other staffs.

According to another aspect of the disclosed technology, there is provided a laser security interlocking method for a laser security interlocking device, the laser security interlocking device including a housing 10, a laser capable of emitting laser light in the housing 10 and a laser light-emitting interlocking circuit, wherein the housing 10 includes a door capable of being opened and closed, and when the door 11 is closed the housing 10 defines an enclosed space within which the laser is positioned.

The laser security interlocking method includes: utilizing the laser light-emitting interlocking circuit to control the laser security interlocking device to automatically stop the laser emitting laser light before or while the door 11 is opened.

In one embodiment, the laser security interlocking method further includes: associating an operation of the door 11 with that of the laser so as to control the door 11 and the laser so that the laser is enabled only when the door 11 is closed and the laser is disabled before or while the door 11 is opened.

In one embodiment, the laser security interlocking method may further include utilizing a door state detecting device of the laser light-emitting interlocking device to detect whether the door 11 is in an opened state or a closed state, and to control the laser according to the detected opened state or closed state of the door 11.

In one embodiment, the laser security interlocking method may further include utilizing an "AND" logic control unit of the laser light-emitting interlocking circuit to receive a signal from the central control unit for controlling the laser and the signal indicating the state of the door 11 detected by the door state detecting device, and to output a laser enable signal by means of hardware circuit based on the signal from the central control unit for controlling the laser to emit laser light and the signal indicating the closed state of the door 11 detected by the door state detecting device, so that the laser emits laser light.

In one embodiment, the laser security interlocking method may further include utilizing the "AND" logic control unit to switch off the laser enable signal by means of hardware circuit so that the laser is disabled to emit laser light when the door 11 is opened.

In one embodiment, the laser security interlocking method may further include utilizing the "AND" logic control unit to switch off a power of the laser when the door 11 is opened.

In one embodiment, the laser security interlocking method may further include controlling the laser not to emit laser light by means of software when the door 11 is opened.

Although some embodiments of the inventive concept of the disclosed technology have been shown and described, it will be understood by those skilled in the art that various changes may applied to these embodiments without departing from the spirit and scope of the inventive concept, The scope of the present invention is defined by the claims and their equivalents.

Although some embodiments of the general inventive concept are illustrated and explained, it would be appreciated by those skilled in the art that modifications and variations may be made in these embodiments without departing from the principles and spirit of the general inventive concept of the disclosed technology, the scope of which is defined in the appended claims and their equivalents. The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments.

What is claimed is:

1. A laser security interlocking device comprising:
   a housing;
   a laser capable of emitting laser light in the housing; and
   a laser light-emitting interlocking circuit,
   wherein the housing comprises a door capable of being opened or closed, and based on the door being closed the housing defines an enclosed space within which the laser is positioned;
   wherein the laser light-emitting interlocking circuit is configured to control the laser security interlocking device to automatically stop the laser emitting laser light before or while the door is opened;
   and wherein the laser light-emitting interlocking circuit comprises:
   a central control unit for associating an operation of the door with that of the laser so as to control operations of the door and the laser so that the laser is enabled only upon the door being closed or the laser being disabled before or while the door is opened;
   a door state detecting device configured to detect whether the door is in an opened state or a closed state, and a signal indicating the detected opened state or the closed state of the door is transmitted to the central control unit;
   an "AND" logic control unit configured to receive a signal from the central control unit for controlling the laser and the signal indicating the state of the door detected by the door state detecting device, and outputting a laser enable signal by means of hardware circuit based on the signal from the central control unit for controlling the laser to emit laser light and the signal indicating the closed state of the door detected by the door state detecting device, so that the laser emits laser light.

2. The laser security interlock device according to claim 1, wherein the "AND" logic control unit is configured not to output the laser enable signal so that the laser is disabled to emit laser light when the door is opened.

3. The laser security interlock device according to claim 1, wherein the "AND" logic control unit is configured to switch off a power of the laser based on the door being opened.

4. The laser security interlock device according to claim 1, wherein the central control unit is configured to control the laser not to emit laser light based on the door being opened.

5. A laser security interlocking method for a laser security interlocking device, the laser security interlocking device comprising a housing, a laser capable of emitting laser light in the housing and a laser light-emitting interlocking circuit, wherein the housing comprises a door capable of being opened or closed, and when the door is closed the housing defines an enclosed space within which the laser is positioned, wherein the laser security interlocking method comprises:

utilizing the laser light-emitting interlocking circuit to control the laser security interlocking device to automatically stop the laser emitting laser light before or while the door is opened;

associating an operation of the door with that of the laser so as to control operations of the door and the laser so that the laser is enabled only when the door is closed or the laser is disabled before or while the door is opened;

utilizing a door state detecting device of the laser light-emitting interlocking device to detect whether the door is in an opened state or a closed state, and to control the laser according to the detected opened state or closed state of the door; and utilizing an "AND" logic control unit of the laser light-emitting interlocking circuit to receive a signal from the central control unit for controlling the laser and the signal indicating the state of the door and detected by the door state detecting device, and to output a laser enable signal by means of hardware circuit based on the signal from the central control unit for controlling the laser to emit laser light and the signal indicating the closed state of the door detected by the door state detecting device, so that the laser emits laser light.

6. The laser security interlocking method according to claim 5, further comprising utilizing the "AND" logic control unit to switch off the laser enable signal by means of hardware circuit so that the laser is disabled to emit laser light when the door is opened.

7. The laser security interlocking method according to claim 5, further comprising utilizing the "AND" logic control unit to switch off a power of the laser when the door is opened.

8. The laser security interlocking method according to claim 5, further comprising controlling the laser not to emit laser light by means of software when the door is opened.

* * * * *